July 24, 1962     W. A. HOWIE     3,045,948
AIRCRAFT VEHICLE

Filed April 17, 1961     3 Sheets-Sheet 1

*INVENTOR*
*WILBERT A. HOWIE*

BY: *Frederick C. Bromley*
ATTORNEY

July 24, 1962

W. A. HOWIE 3,045,948

AIRCRAFT VEHICLE

Filed April 17, 1961

INVENTOR
WILBERT A. HOWIE

BY Frederick C. Bromley

ATTORNEY

July 24, 1962  W. A. HOWIE  3,045,948
AIRCRAFT VEHICLE

Filed April 17, 1961  3 Sheets-Sheet 3

INVENTOR
WILBERT A. HOWIE

BY: *Frederick E. Bromley*

ATTORNEY

United States Patent Office 3,045,948
Patented July 24, 1962

3,045,948
AIRCRAFT VEHICLE
Wilbert A. Howie, 52 Wragg St., Trenton,
Ontario, Canada
Filed Apr. 17, 1961, Ser. No. 103,399
Claims priority, application Canada June 15, 1960
10 Claims. (Cl. 244—12)

My invention relates to improvements in aircraft possessing the facility of vertical take-off and landing, and aims to provide a craft of this kind which not only is highly stable when airborne but which is also capable of vertical rise and landing and furthermore is adapted for universal flight i.e., flight in any direction, either horizontally, vertically, etc., under exacting control and at variable speeds, comparable with modern high-speed aircraft. My invention comprehends an aircraft of the kind referred to which is possessed of strong lifting force and one in which the change from vertical to horizontal flight is accomplished with ease and safety.

The aircraft of my invention has nothing in common with the conventional helicopter as it does not employ rotary vanes or blades to keep it in the air. My invention provides a flying machine which while possessed of the advantages of a helicopter, not only overcomes the shortcomings of such an aircraft but provides a vehicle capable of high flight speeds with attendant manoeuvrability. Additionally, my invention provides an aircraft which is inherently stable in flight, which stems from the principle on which it operates with regard to vertical rise.

In this broad aspect, my invention comprehends a basically new principle of operation involving the provision of any aircraft having a body in the form of a fuselage divided into two separate main parts, there being a lower main part supplied with a top air-foil surface, and an upper main part in the form of a super-structure spaced therefrom and having internal air-jet means including a venturi for producing a low pressure intermediate zone. The super-structure is united with the lower structure and houses the jet-producing means for producing the venturi effect. The lower main part is characterized by the said air-foil surface at the top thereof and including a downwardly curved profile in continuous outward direction over which there is a dispersion of a stream of high-velocity air and/or high-velocity gases which are operative to bring about an input of atmospheric air through an opening or openings in the top body part and entrain the same in the high-velocity stream whereby the induced intermediate low-pressure zone creates an air pressure differential as between the top side of the said upper main section and the underside of the said lower main section. Accordingly, a lifting effect is brought about on the body of the aircraft by this pressure differential. By rearwardly directing and properly locating the venturi outlet or orifice with respect to the air-foil surface of the lower main part a forward thrust and traction is imparted to the aircraft.

My invention furthermore comprehends auxiliary means for creating forward propulsion of the craft as by employing turbo-jet engines with after-burners interposed in suction ducts extending from the top surface of the upper structure of the fuselage and leading rearwardly.

These and other features of construction are more clearly brought out in the ensuing specification and the accompanying drawings forming a part thereof.

The drawings illustrate several embodiments of the invention, in which.

Figure 1:
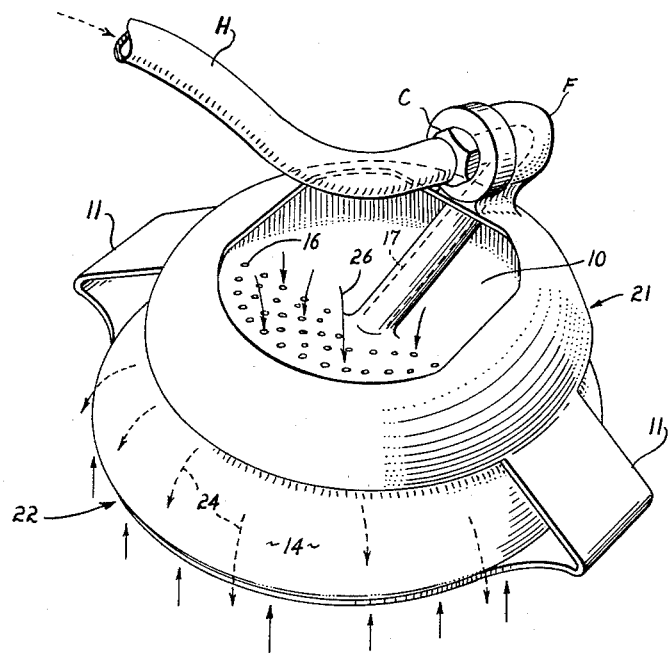
FIGURE 1 is a perspective view of a demonstration model that was built to establish the practicability of the principle of operation.
Figure 2:
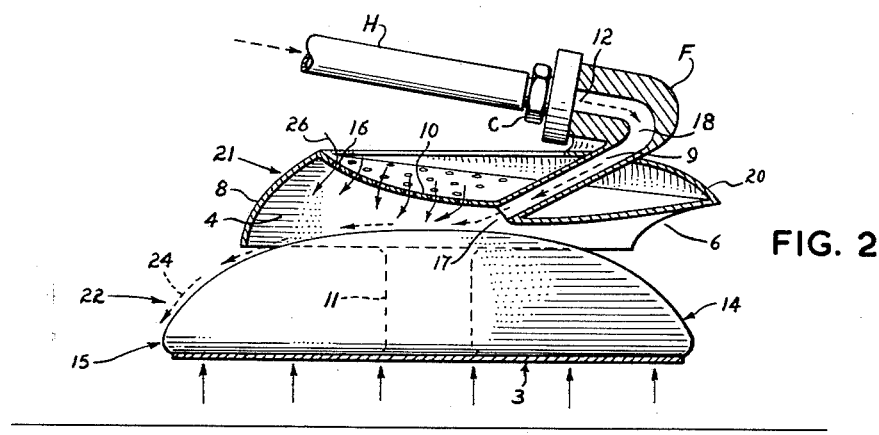
FIGURE 2 is a side-elevation partly in section of FIGURE 1.

Now, we will first consider the disclosure of the invention contained in FIGURES 1 and 2, wherein there is depicted a demonstration model which I constructed in order to establish the theory of my invention. This model does not incorporate a prime mover for generating high-velocity air or high-velocity gases, such as would be produced by a jet engine, but was powered by compressed air from a tank and delivered to the craft as by a hose-line H connected as by the coupling C to the fitting F for the introduction of the high-velocity air into the craft as will be hereinafter more fully recounted.

The body of the aircraft comprises two main parts, there being a lower main part 22 and an upper main part 21. The parts 21 and 22 are rigidly joined together by the members 11 disposed at opposite sides of said body. Said lower main part 22 is shown as provided with a planar lower surface 3 and an upper face 14 presenting an air-foil surface which is shown as of circular configuration in plan and is continuously curved in all directions downwardly to the surrounding edge portion 15.

The upper main part 21 is spaced above the lower main part 22 and provides therebetween a low pressure area or chamber 4, which communicates with induction holes 16 supplied in top wall 10 of the upper part 4. Wall 10 is dished as shown in FIGURE 2 and is marginally merged into a downwardly curved imperforate wall 8 whose lower edge terminates short of the lower main part 22.

A venturi structure is provided which includes the fitting F and comprises the forwardly directed induction passage 12 which receives the high-velocity air from the flexible tube H and communicates by means of a crook 18 with a downwardly and rearwardly inclined duct 9 which breaks through wall 10 to communicate with the low pressure zone 4 at a point forwardly of the vertical axis of the lower main section 22 or the crest of the air-foil surface 14.

This structure provides a venturi throat 17 whereby high-velocity air in its discharge within the depression zone sweeps rearwardly over the air-foil surface, as indicated by the arrows denoted at 24 and induces suction whereby air is drawn in through the perforations 16 of the top wall 10 to lower the pressure at this relatively high-pressure top side of the vehicular body. At the frontal portion of the upper main part 21 there is provided an opening 6 below the downwardly curved portion 20 of the encompassing wall part and this opening functions to admit air for replacing the air drawn out by the high-velocity air travelling over the lower surface 14 of the circular undersurface of the venturi formed in chamber 4.

As has been mentioned earlier, my vertical take-off and landing vehicle is constructed to utilize high-velocity air from a source of supply in order to create a low-pressure zone in the special area intervening the top and lower main members of the provision of the venturi throat as herein disclosed.

In operation high-velocity air is delivered through the tube H to the venturi structure and discharged at the venturi throat 17 whereby creating an area of low pressure intermediate of the said upper and lower main parts as the jet or stream of high-velocity air is diffused in rearward direction and spread over the air-foil surface 14 adhering to the same in its travel. This brings about a relatively high pressure on the under side 3 of the lower main body 22 due to pressure differential and simultaneously there is induced a relatively lower pressure zone at the upper side of the top main member 21 as atmospheric air is drawn through apertures 16, as indicated by the arrows denoted at 26. The air as it is sucked through said aperture is entrained in the flow of high-velocity air and in consequence there is induced a relatively low pressure zone at the upper side of the vehicular body and this brings about a lifting force causing the vehicular body to rise vertically. It will be understood by controlling input of the high-velocity air the rate of rise can be controlled and also the vehicle can be caused to hover at will.

According to demonstrations carried out by me conforming to the disclosure herein recounted the model craft has been caused to rise vertically and to hover and also to travel in horizontal flight.

Figure 3:
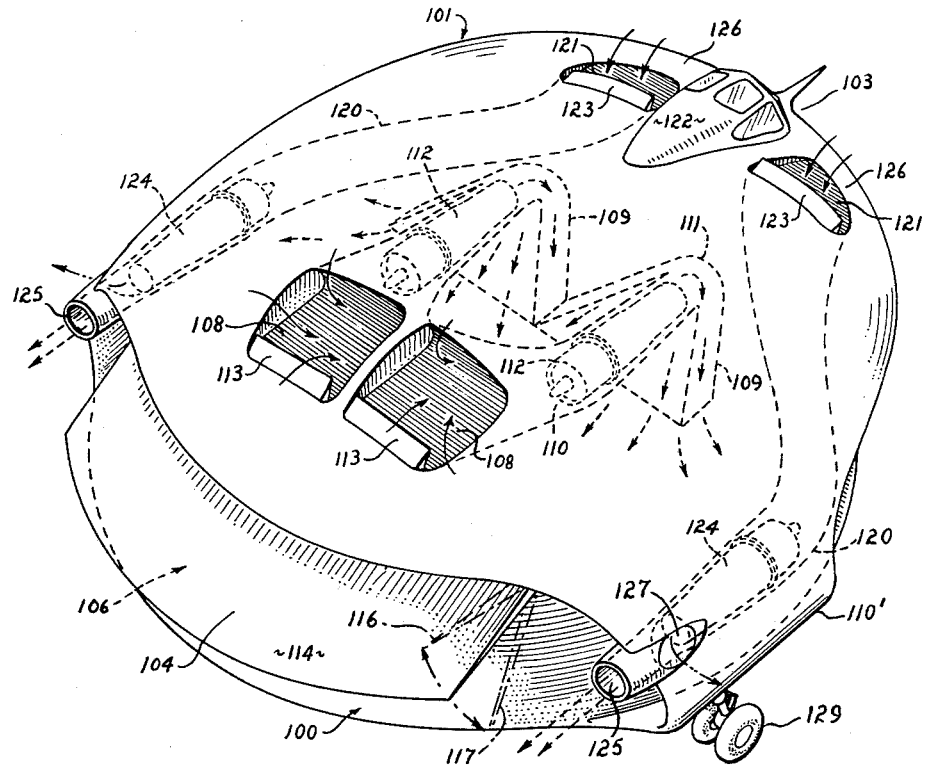
FIGURE 3 is a perspective view of an aircraft constructed in accordance with the invention.
Figure 4:
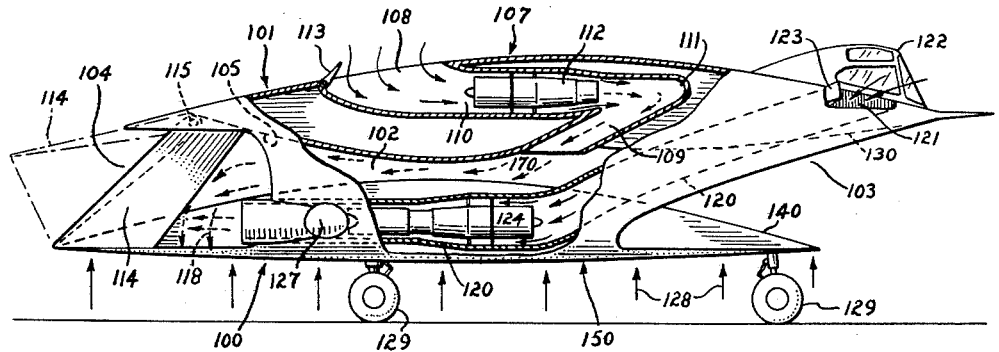
FIGURE 4 is a side-elevation partly in section of the aircraft illustrated in FIGURE 3.

In FIGURES 3 and 4, I have disclosed a practical and useful embodiment of an aircraft incorporating my invention. The embodiment herein shown may be employed for passenger and/or freight loads and is designed with a view for large-capacity loads over a long distance and at a fairly moderate speed. However, it will be understood that modifications in this respect is entirely within the ambit of the invention as herein shown.

According to the basic design, the aircraft comprises a lower main part, generally denoted at 100, and an upper main part, designated as a whole at 101, spaced apart for creating an intermediate low pressure zone or chamber, generally denoted at 102, and incorporating venturi surfaces and a venturi throat 170 as previously recounted. The low-pressure intermediate space 102 provides a passage which extends from the front of the craft 103 to the rear thereof, indicated at 104. The air-foil surface 140 sweeps downwardly from a crest point on a curvature as shown in FIGURE 4 and this crest point is displaced somewhat rearwardly from the venturi throat 170. The confronting upper venturi surface which forms a part of the intermediate low-pressure zone 102 is profiled to sweep upwardly on a curvature in rearward direction as indicated at 105, and this enlarges the output end and provides an egress that substantially extends from side-to-side of the craft at the rear end thereof, as indicated at 106 in FIGURE 3.

The top surface 107 of the upper main section of the craft is curved and presents an air foil interrupted by one or more substantial ingress openings 108 of which there are two shown in FIGURE 3. These ingress openings are the induction ducts individually leading to venturi passages, indicated at 109. The ingress passages 108 each lead into an induction passage 110 forwardly directed to communicate with the respective venturi duct 109 which is reversely and rearwardly directed from the juncture 111. The venturi passage 109 terminates at the venturi throat 170 and inclines downwardly with respect to a horizontal plane.

There is interposed in each induction passage 110 a turbo fan (front-end type) jet engine, denoted at 112 which functions to draw air into this passage for discharge through the venturi structure rearwardly of the low pressure zone between the upper and lower main body structures. The high-velocity gases from the engine, along with the entrained air, are swept rearwardly over the airfoil surface 140 and disgorged through the enlarged rear end opening 106.

An air regulating flap is indicated at 113 for the ingress opening of each of the induction passages 110. At the rear discharge end of the low pressure creating passage 102 there is provided a venturi control flap 114 hinged at 115 and swingable between upper and lower extreme positions indicated in phantom in FIGURE 3 at 116 and 117 respectively. This flap member is suitably controlled in known manner (not shown) and when swung down laterally deflects the high-velocity air and exhaust gases, as best shown in FIGURE 4, and indicated by the arrows 118.

The lateral structures 110′ at each side of the body of the craft serve to unite the upper and lower main parts as hereinafter recounted and in the side parts there are provided fluid ducts as at 120 forwardly extending to ingress openings 121 at the front of the craft within the upper structure 101 and laterally of the pilot's quarters, indicated at 122. The ingress openings 121 are shown as supplied with controllable hinged flaps 123, as regulating devices.

Mounted within each of the ducts or passages 120 is a turbo-jet engine, denoted at 124, whereby high-velocity gases are created and discharged through each passage to the egress 125. The turbo-jet engines 124 have afterburners and any number of such engines may be supplied and functioning to draw air into the passages 120 at each side portion 110 of the craft. In this way atmospheric air is taken in from the front top surface 126 and induced air is accelerated by the turbo-jet engines 124 thereby causing an injector action to draw atmospheric air through the passage 120 and mix it with the high-velocity exhaust gases from the jet engine. The induced air can be used to feed the after-burners and can be deflected out of the large deflecting flaps 127 which control lateral discharge openings in said passages 120 in advance of the afterburners.

In the operation of this aircraft the jet engines function to draw in atmospheric air through the inlets 108 and to deliver this air at high-velocity along with the high-velocity gases through the venturi passages 109 for discharge at the venturi throat 170 whereby the entrained air and the high-velocity gases are diffused rearwardly between the upper and lower main part of the body and discharged through the rear outlet in diffused manner for effecting a low pressure zone intermediate of the main body members. In this way there is created a relatively high pressure at the underside of the lower main member, as indicated by the arrows 128, and accordingly a relatively low pressure zone is produced at the top side 107 of the upper main member of the body to bring about the lifting effect. As the high-velocity jet exhaust gases leave the jet engines 112 and are subsequently deflected over the rear portions of the venturi surface 140 the desired low pressure depression zone is brought about as has been recited. The control flaps 113 act as deflectors to turn the passing air to the respective openings 108 when properly adjusted and the flaps 123 similarly function.

A craft in accordance with this construction may have an immense lifting power and is capable of being easily and safely controlled while possessing a maximum degree of stability under all flight conditions. This will be apparent in that the lifting force acting on the craft tends to stabilize it under all conditions.

In plan the craft is shown as having a substantially ellipsoidal contour. The side structural portions 110′ are dynamically streamlined from front to rear in order to cleave the air in the most efficient manner. This streamlining is designed to create a low pressure area on the side portions 110′ in the vicinity of the venturi throat and to concurrently create a high pressure area on the outside of the side portions in order to keep the vehicle on a straight course, particularly when travelling forward at high speed. When the vehicle is rising or hovering the large deflecting flaps 127 are employed to control the flying position of the vehicle by deflecting the high-velocity air and exhaust gases from the jet engines 124 to bring about the desired flight conditions. These deflecting flaps 127 may not be used when the after-burners, which are mounted rearwardly thereof, are in operation and suitable switch means may be employed to control the deflecting flaps in accordance with known means. These deflecting flaps are operative to turn the vehicle and would be under control of the pilot. It will be understood that suitable elevons for elevational purposes may be supplied at the rear of the stream-lined air-foil structure of the body and controlled in conventional manner.

It will be understood that in the construction of this aircraft a skin of suitable material will be supplied and that parts will be designed to take care of the necessary stresses and heat condition of parts, etc., so that a serviceable and durable craft may be presented embodying the invention.

The aircraft is shown as supplied with landing gear, generally indicated at 129, which may be of the conventional type and it will be understood that as an alternative the craft may be designed to land on water.

The pilot's quarters will be suitably designed and need not be recounted in detail. The ingress elements 108 and 121 may be of the scoop type well known in the art of aircraft structure. Fuel may be carried in the side portions 110' or at any other location found desirable in the manufacture of the aircraft.

Figure 5:
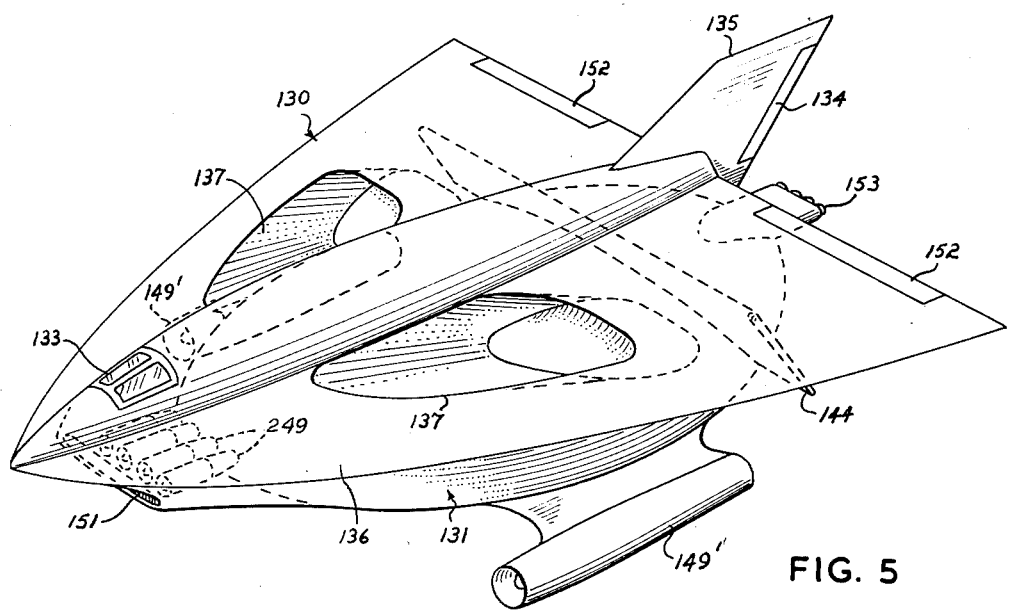
FIGURE 5 is a perspective view showing a variant form of the invention in which the aircraft is of the delta-configuration.
Figure 6:
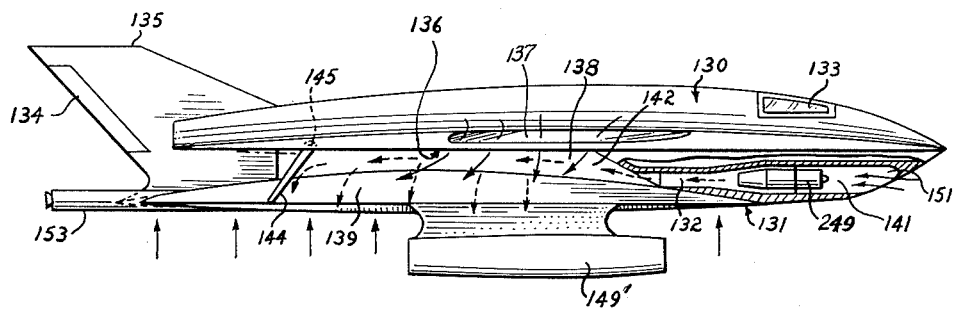
FIGURE 6 is a side-elevation thereof partly in section.

Now, adverting to FIGURES 5 and 6, there is shown therein a delta-type of aircraft in which my invention is incorporated. The body or fuselage comprises an upper main section 130 and a lower main section 131 integrally joined together in spaced relation to provide an intermediate depression for low pressure zone or chamber, generally denoted at 132, and providing a through passage for high-velocity gases and entrained air. The upper main part 130 presents a main plane of a delta shape, and at its forward end there is indicated at 133 a pilot's cabin and at the rear end there is a rudder 134 carried on the vertical fin 135.

Said main plane presents an upper air foil surface 136 which is interrupted by two large air inlets, denoted at 137, which may be of the construction recounted earlier, and will be supplied with control flaps for regulating the amount of air admitted as has been previously recounted. These air inlets or air openings will be of the scoop type and communicate with inwardly offset and longitudinally extending low pressure or depression passage, indicated at 138. This passage extends laterally as well as longitudinally with respect to the upper air-foil surface 139 provided on lower main section 131. The air-foil surface 139 is curved similar to the air-foil surface of the modification previously described. Accordingly, air induced to flow into the inlet 137 functions to lower the relatively high pressure upper surface 136 of the main plane 130 and the air induction is carried out by high-velocity exhaust gases emanating from the turbine engines 249, located at the forward end of the craft and disposed in the induction passage 141 which extends rearwardly from the front end of the craft intermediate of the upper and lower main section 130 and 131.

The turbo-jet engines 249 are supplied with afterburners and there is provided a venturi throat 142 in the zone of which the high-velocity exhaust gases entrain and disburse atmospheric air drawn in through the inlets 137. Accordingly, the entrained air and the high-velocity exhaust gases are diffused rearwardly and laterally in the depression or low pressure zone between the upper and lower main bodies of the craft as herein before recounted. It follows that in this way a lift is imparted to the body of the vehicle by creating a pressure differential between the underside of the lower body member and top side of the upper body member as has been dealt with earlier.

The two air inlet openings 137, are shown by way of example but not of limitation, as also are the turbo-jet engines which may vary in number. The offsets in the induction passages 137 are desirable in order that exhaust gases may be precluded from reaching the upper surface 136 of the main wing, and this offset enables the high-velocity exhaust gases from the jet engines to create a suction in passing beneath the under surface of the delta-shaped upper main plane or control platform 130.

A transverse control flap 144 is provided subjacent the main plane 130 and is hinged at 145 to swing downwardly from a horizontal attitude under control of the pilot. This control flap when swung downwardly to an intercepting position with respect to high-velocity gases and the entrained air serves to divert the same downwardly and precludes forward propulsion of the craft. Accordingly, forward propulsion of the craft is controlled and it may be caused to hover or travel in forward direction at regulated speeds. Moreover, it will be understood that it will have controlled vertical rise. It will be understood also that instead of using a single control flap 144 a plurality of such flaps may be employed. In the case of the use of two flaps, one may be at each side of the vehicle and be operated independently for guidance of the craft.

The aircraft is also shown as supplied with turbo-fan jet engines 149', one at each side of the body, and suitably housed. These turbo-fan jet engines are so arranged that when the craft is in forward flight, as powered by the tubular-jet engines 249 the turbo-fan jet engines 149', may take over the propulsion of the vehicle entirely on their own, or on the other hand, may be employed as supplemental prime movers.

It will be noted that the leading end of the passage 141, in which the turbo-jet engines 249 are housed, is open and provides an air inlet opening 151 which may be of a more or less scoop formation as found desirable. Elevons 152 are shown as supplied at the trailing edge of the main plane 130. It is conceivable that rocket motors, such as those indicated at 153 at the rear of the main lower section of the vehicle, could be employed economically to boost the vehicle into outer-space after the turbo-jet engines 249 have taken over. These and other modified arrangements may be resorted to as coming within the scope of the invention. It will be understood, furthermore, that a vehicle of this kind would necessarily have to be designed to take care of the mechanical stresses, heat conditions, etc., that are inherent in this novel concept which presents a distinct technical improvement in aircraft of this kind.

While the invention has been disclosed in several practical embodiments it will be understood that such changes and variations may be resorted to as fairly come within the scope of the appended claims.

What I claim is:

1. In an aircraft, a body having a lower main part and an upper main part thereover, said main parts joined together in spaced relation and providing an intermediate chamber therebetween, said lower main part having a continuous upper face presenting an air-foil surface in said chamber and having a substantially free peripheral margin, said upper main part having a top surface interrupted by at least one air inlet opening which is in communication with said chamber, opposed surfaces of said upper and lower parts forming a venturi throat at said intermediate low pressure zone for discharge of a high velocity fluid to draw atmospheric air into said air inlet opening to lower the ambient air pressure in said chamber on said air foil surface of said upper main part so that there will be a relatively higher pressure reacting on the underside of said lower main part thereby creating a lifting effect on said body, and a source of high velocity fluid directed angularly toward said air foil surface toward said air inlet opening, said air foil surface comprising a continuous arcuate surface having a substantially centrally located crest, said source of high velocity fluid being directed toward said crest and being radially dispensed thereby toward the peripheral margins of said air foil surface.

2. The structure of claim 1; wherein said chamber is open at opposite ends providing a through passage, and said venturi throat is located intermediately of said through passage.

3. The structure of claim 1, wherein said air foil surface is downwardly curved radially in all directions from said crest, said crest being spaced from said venturi throat in the direction toward which said high velocity fluid is directed, said upper main part surface forming said chamber being slightly spaced from said air foil crest to form said venturi throat.

4. The structure of claim 3; wherein said source of high velocity fluid comprises a power plant having an exhaust outlet communicating with said venturi throat.

5. The structure of claim 4; including auxiliary power plant means on said body for providing thrust to said body independently of said high velocity fluid.

6. The aircraft of claim 1, and in which a control flap regulates said air-inlet opening.

7. The aircraft of claim 1, and in which said air-inlet opening is of a scoop configuration.

8. The structure of claim 2; including air passage deflection means at the exit of said through passage for controlling air movement therethrough.

9. The structure of claim 3; wherein said power plant comprises an internal combustion engine of the turbo jet type.

10. The structure of claim 1; including flight direction control means on said body for controlling various flight attitudes thereof.

References Cited in the file of this patent
UNITED STATES PATENTS

| | | |
|---|---|---|
| 1,585,281 | Craddock | May 18, 1926 |
| 2,703,477 | Anxionnaz | Mar. 8, 1955 |
| 2,807,428 | Wibault | Sept. 24, 1957 |
| 2,945,642 | Nofi | July 19, 1960 |
| 2,973,921 | Price | Mar. 7, 1961 |